United States Patent [19]

Blais et al.

[11] Patent Number: 5,477,673
[45] Date of Patent: Dec. 26, 1995

[54] HANDLING BLEED VALVE

[75] Inventors: Daniel Blais, Mont St. Hilaire; Eric Tremaine, Longueuil; Vasil Ozarapoglu, St. Lambert, all of Canada

[73] Assignee: Pratt & Whitney Canada Inc., Longueuil, Canada

[21] Appl. No.: 288,380

[22] Filed: Aug. 10, 1994

[51] Int. Cl.⁶ .................................................. F02C 9/18
[52] U.S. Cl. ............................... 60/39.07; 60/39.29
[58] Field of Search .......................... 60/39.07, 39.29, 60/226.1, 226.3; 137/115, 116; 415/26, 27, 28; 251/123

[56] References Cited

U.S. PATENT DOCUMENTS

| | | | |
|---|---|---|---|
| 1,862,289 | 6/1932 | Anderson. | |
| 2,092,961 | 9/1937 | Eickstaedt | 138/47 |
| 2,375,411 | 5/1945 | Grant | 137/116 |
| 2,473,620 | 6/1949 | Teague, Jr. | 251/145 |
| 2,531,942 | 11/1950 | Lee | 251/8 |
| 2,645,244 | 7/1953 | Klickman | 137/561 |
| 2,693,904 | 11/1954 | Boyd | 230/122 |
| 2,702,665 | 2/1955 | Ledwith | 230/114 |
| 2,850,227 | 9/1958 | Wheatley | 230/114 |
| 3,108,767 | 10/1963 | Eltis et al. | 60/39.07 |
| 3,360,189 | 12/1967 | Cook | 230/115 |
| 3,398,928 | 8/1968 | Fredd | 251/251 |
| 3,638,428 | 2/1972 | Shipley et al. | 60/226 |
| 3,747,341 | 7/1973 | Davis | 60/226 |
| 3,898,799 | 8/1975 | Pollert et al. | 60/226 |
| 3,941,498 | 3/1976 | Duckworth et al. | 415/46 |
| 3,979,105 | 9/1976 | Pool et al. | 251/123 |
| 4,050,240 | 9/1977 | Vaught | 60/39.65 |
| 4,120,156 | 10/1978 | McInerney | 60/602 |
| 4,522,592 | 6/1985 | Johnson | 433/95 |
| 4,671,318 | 6/1987 | Benson | 60/39.07 |
| 4,715,779 | 12/1987 | Suciu | 60/39.07 |
| 4,827,713 | 5/1989 | Peterson et al. | 60/226.1 |
| 4,886,416 | 12/1989 | Wunderlich | 415/158 |
| 4,998,562 | 3/1991 | Foltz | 137/877 |
| 5,261,228 | 11/1993 | Shuba | 60/39.07 |
| 5,279,109 | 1/1994 | Liu et al. | 60/39.07 |

Primary Examiner—Louis J. Casaregola
Attorney, Agent, or Firm—Alan C. Cohen; Jeffrey W. Astle

[57] ABSTRACT

The present invention discloses a bleed valve for use in gas turbine engines. The valve has a piston, one end of which is positioned inside a housing which is positioned on one side of the by pass fluid flow path. The other end of the piston is positioned in an opening between the primary fluid flow path and the bypass fluid path such that the valve opens and closes in response to a pressure differential between two points in the primary fluid flow path.

10 Claims, 5 Drawing Sheets

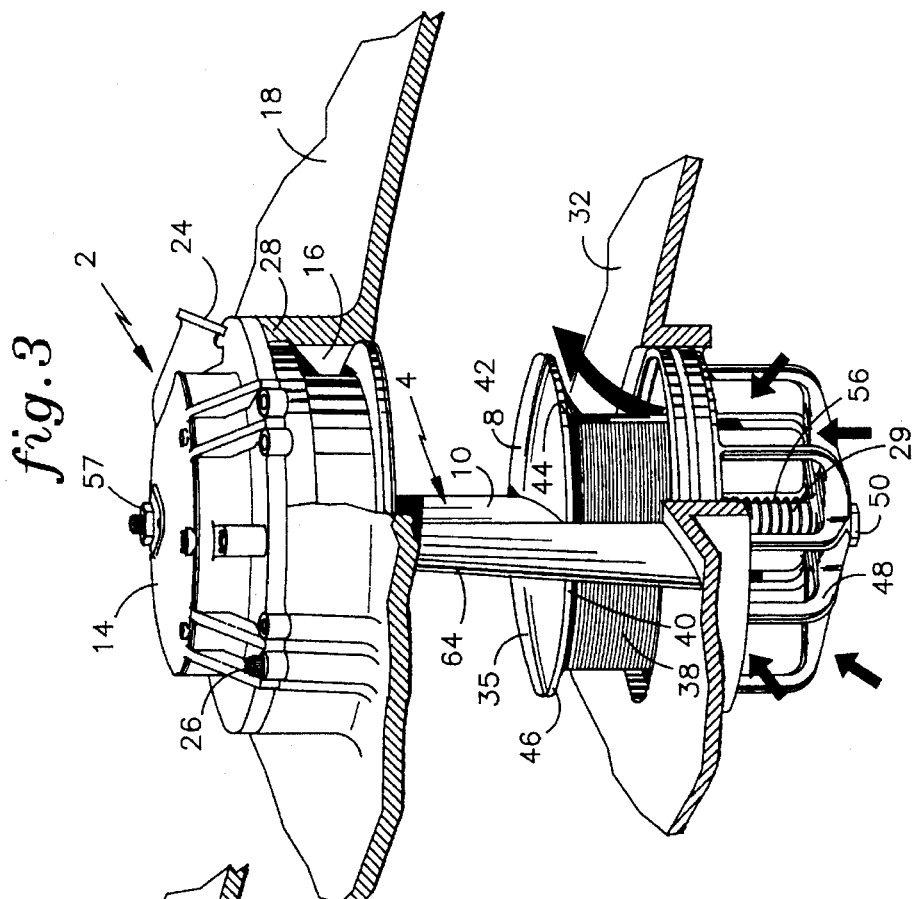
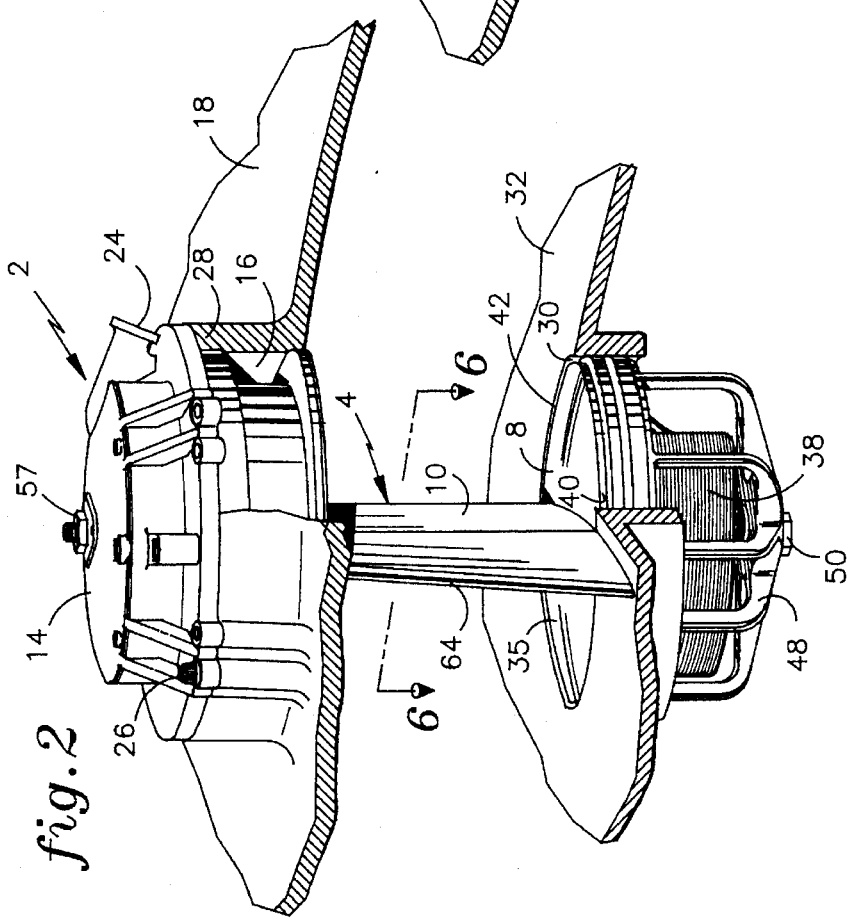

HANDLING BLEED VALVE

TECHNICAL FIELD

The technical field to which this invention pertains is gas turbine engines, particularly handling bleed valves for gas turbine engines.

BACKGROUND OF THE INVENTION

In gas turbine engines for use in powering aircraft, air is directed through multiple stage compressors as it flows axially or axially and radially through the engine to a combuster. As the air passes through each successive compressor stage, the pressure of the air is increased. Under certain conditions, such as when the engine is operating at off design conditions, interstage bleed is required to match the compressor stages. If this compressor matching is not acheived an engine surge or blow-out may occur, endangering the operation of the engine and the associated aircraft.

To mitigate against these conditions, such gas turbine engines have incorporated bleed valves in the engine casing forward of the burner which, when an engine surge is imminent, open to rematch the compressor stages. These bleed valves have taken many forms from simple ports in the compressor casing which open via a movable valve element to devices which separate adjacent segments of the engine casing thereby creating an opening there between.

However, these valves, although useful, present problems where the air bleed off is directed into a secondary air flow, in lieu of being dumped overboard. In the design of these prior art bleed valves all of the criteria which must be met such as, simple maintenance of the valve, maintenance of a smooth fluid flow through the bypass flow path and quick response time are not all addressed in any single prior art valve.

Therefore, what is necessary in this art is a bleed valve that is simple to service, minimizes the disturbance to the secondary air flow and offers quick response to the pressure changes which lead to the engine operating problems.

BRIEF DESCRIPTION OF THE INVENTION

The present invention discloses a bleed valve for use in a gas turbine engine in which a housing is positioned on the outboard perimeter of a bypass fluid flow path. A piston having a first end is fitted into said housing and extends across the by pass fluid flow path to a barrier separating the by pass fluid flow path from a primary fluid flow path. The piston having a second end opposite to the first end is sealably fitted into an opening in the barrier and wherein the piston is slidably movable to seal and unseal the opening in response to a pressure differential between the two locations in the primary fluid flow path.

This invention will permit the use of a bypass valve which will respond to prevent surges in the engine and will be easily serviced without disassembly of the engine due to its positioning across the by pass flow path and having the housing on the perimeter of the by pass flow path.

BRIEF DESCRIPTION OF THE DRAWINGS

FIG. 2 is a breakaway view of one embodiment of the valve of the present invention depicting the valve in the closed position FIG. 3 is a breakaway view of one embodiment of the valve of the present invention depicting the valve in the open position.

BEST MODE FOR CARRYING OUT THE INVENTION

Figure 1:
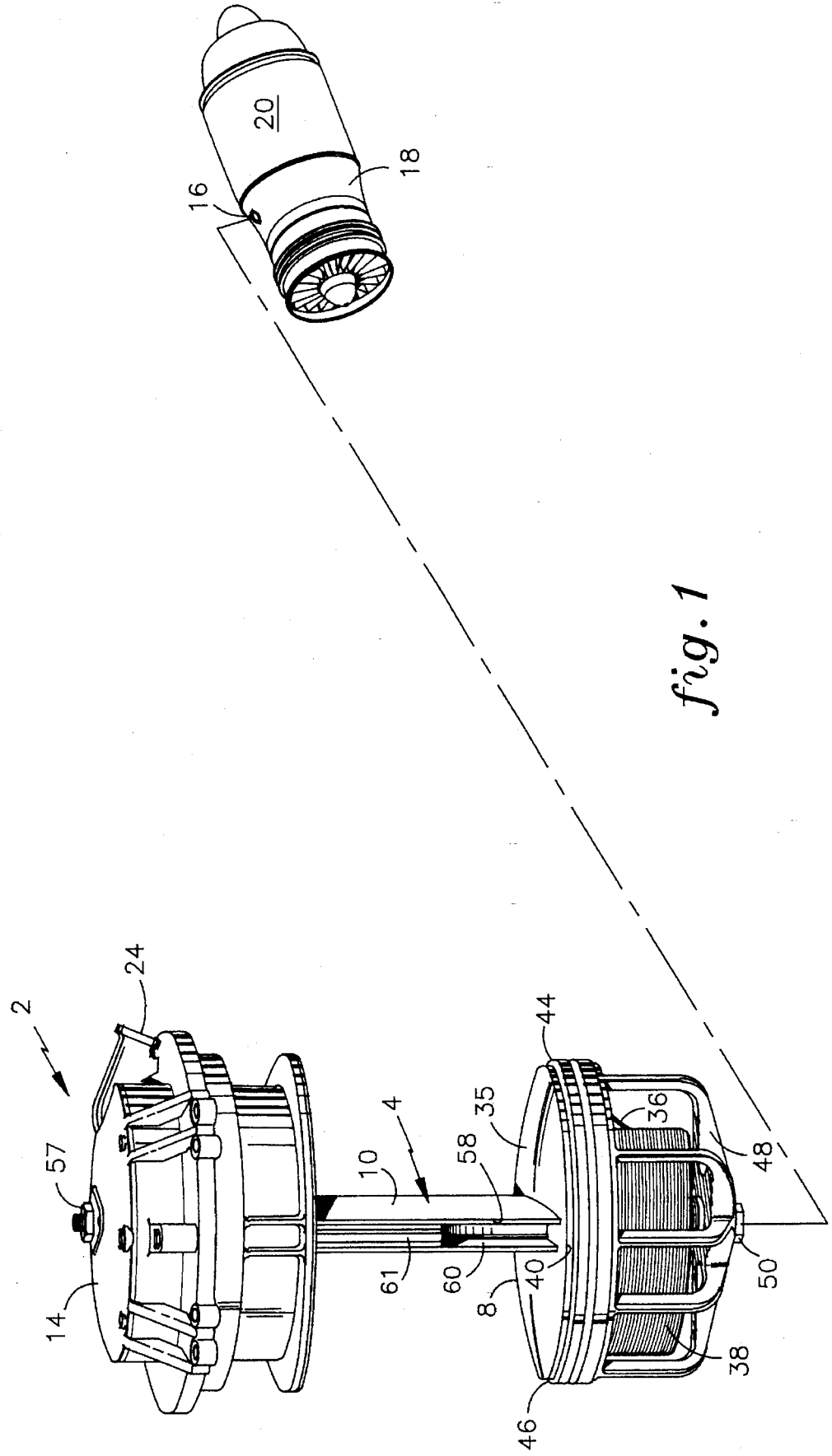
FIG. 1 is a view of one embodiment of the valve of the present invention indicating its location in a gas turbine engine.

The bleed valve of the present invention will be described herein with reference to FIGS. 1–6. The description and the drawings are intended to be exemplary and not limiting.

Referring now to the Figures in which the bleed valve of the present invention is shown. The bleed valve 2 comprises a piston 4 having a first end 6 and a second end 8 connected by a center portion 10. The first end 6 is fitted into a chamber 12 inside a housing 14. The housing 14 is fitted into an opening 16 in the outer perimeter of the by bypass flow path, in this case the outer shroud 18 of the engine 20. The chamber 12 of the housing 14 is in flow or pressure communication with one location within a primary flow path 22 of compressed gas passing through the engine 20. Via an opening 24 in the housing 14 a controlling pressure is introduced to schedule the valve opening.

In the present description the housing 14 is formed of a single unit which is attached to the outer shroud 18 by a number of bolts 26 and which is seated onto a flange 28 on the perimeter of the opening 16. The piston 4 is slidably mounted onto a rod or similar means 29 which passes longitudinally through substantially the center of the piston 4.

The second end 8 is formed such that it will seat in and seal an opening 30 in a barrier separating the bypass flow path 34 from the primary flow path 22, in the present embodiment this is the inner shroud 32, and thereby prevent any of the primary fluid flow 22 to pass to the bypass fluid flow path 34 through said opening 30 when the piston 4 is in the closed position. This may be achieved in any number of designs.

Figure 5:
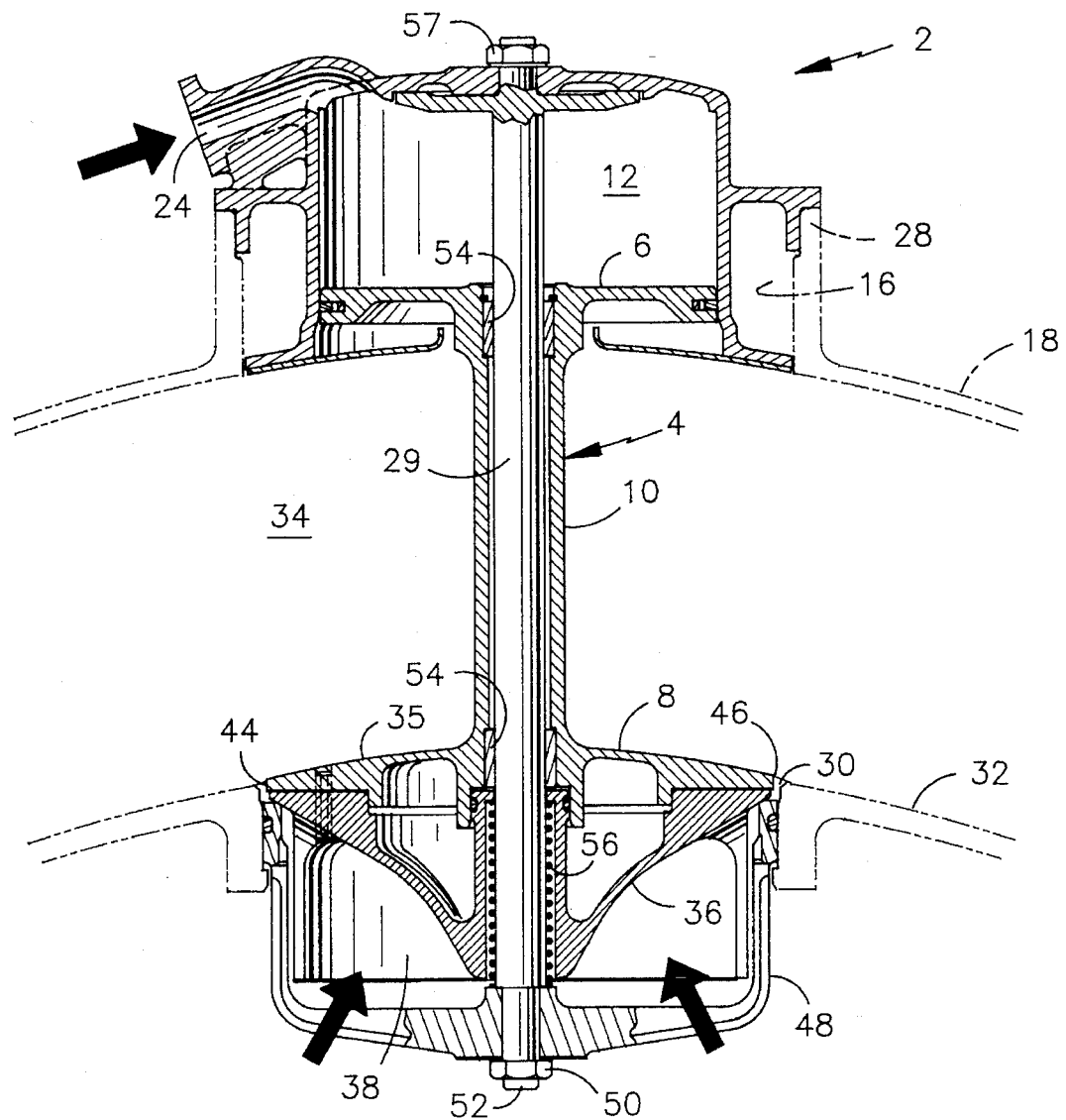
FIG. 5 is a cross sectional view of one embodiment of a valve of the present invention positioned in a gas turbine engine in the closed position.

The present embodiment depicts an aerodynamic design for the second end 8 in which the top 35 of the second end 8 is smooth and forms a smooth plane with the surface of the inner shroud 32 when the valve 2 is in the closed position as shown in FIGS. 2 and 5. However, that portion of the second end 8 which is below the inner shroud 32 when the valve 2 is in the closed position, the bottom 36 of the second end 8, is downwardly inwardly frustoconically tapered. Although it is not necessary that the bottom 36 be formed in such a manner, it is preferred that it be formed in such a shape so as to permit an even transition zone for the fluid to flow from the primary flow path 22 into the bypass flow path 34, and to control the rate of opening and closing of the valve.

In addition, a portion of the bottom 36 which is facing upstream of the bypass fluid flow path 34, is in the form of an arcuate apron 38 extending around the leading edge 40 of the circumference 42 of the second end 8, from about one side 44 of the second end 8 of the piston to the opposite side 46 of the second end 8 of the piston and crossing the plane perpendicular to the bypass flow path 34. The apron 38 further extends from just under the top of the second end 8 to just below the inner shroud 32 when the valve 2 is in the open position (See FIG. 3). This apron 38 prevents bleed flow exit in the upstream direction of the by-pass flow. Such a flow will disturb the fan by affecting its stability, reducing surge margin and increasing noise level.

Figure 4:
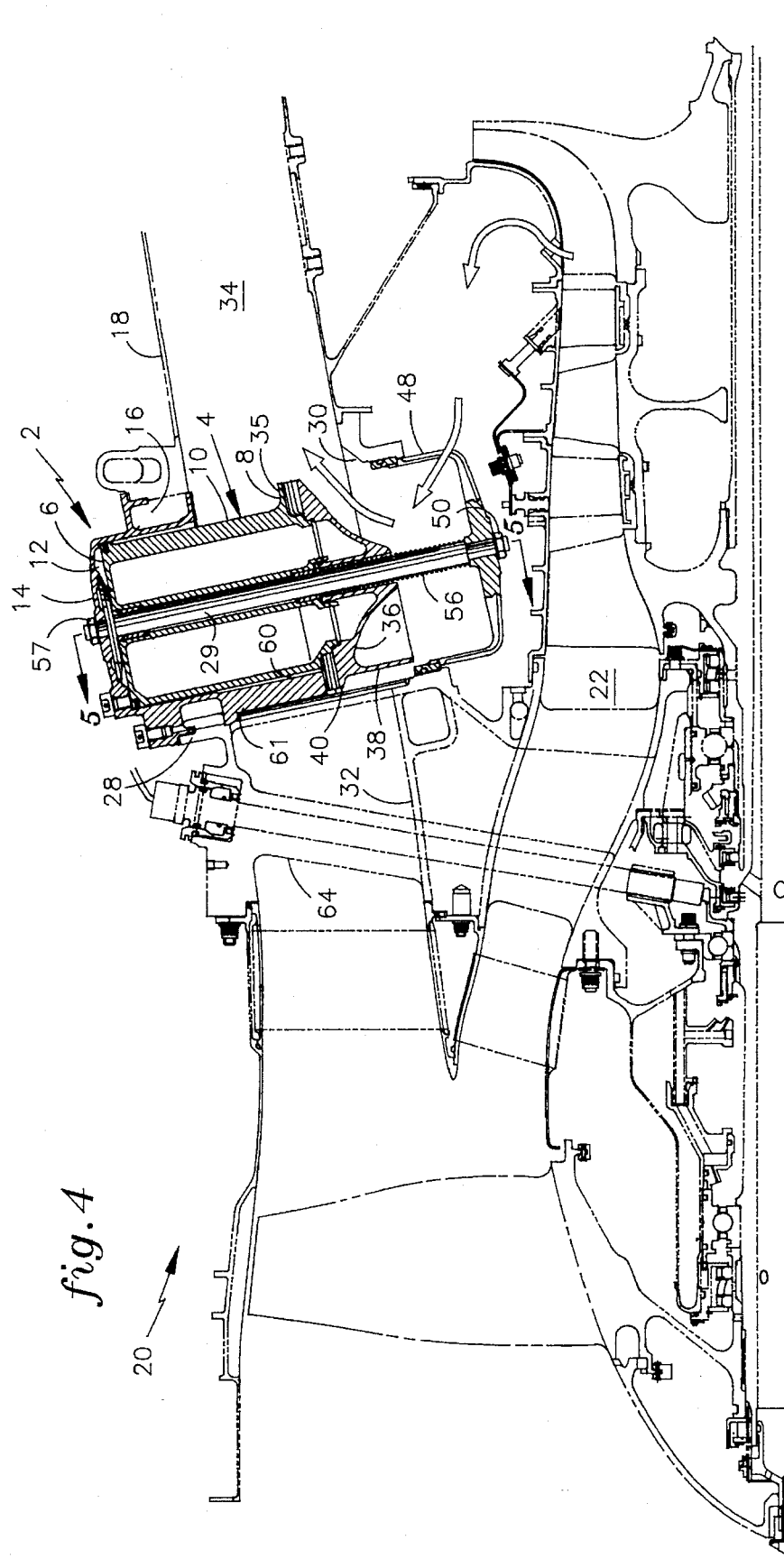
FIG. 4 is a cross sectional view of one embodiment of a valve of the present invention positioned in a gas turbine engine in the open position.

As depicted in FIG. 4 and 5 the opening 30 in the inner shroud 32 houses the structural framework 48 to support the rod 29 on which the piston 4 is slidably fitted. The rod 29 is removably connected to the structural framework 48 by a nut 50 threaded onto the end 52 of the rod 29 and the other end of the rod 29 is removably fixed in the same manner to an opening in the housing 14 by a nut 57. Bushings 54 are introduced between the rod 29 and the piston 4 to ensure free sliding movement of the piston 4. A compression spring 56 is fitted on to rod 29 at the end 52 between the structural framework 48 and piston end 8 to ensure that with no pressures acting on the piston 4, the piston 4 will remain in a partly open condition. This valve position will enhance engine starting.

Figure 6:
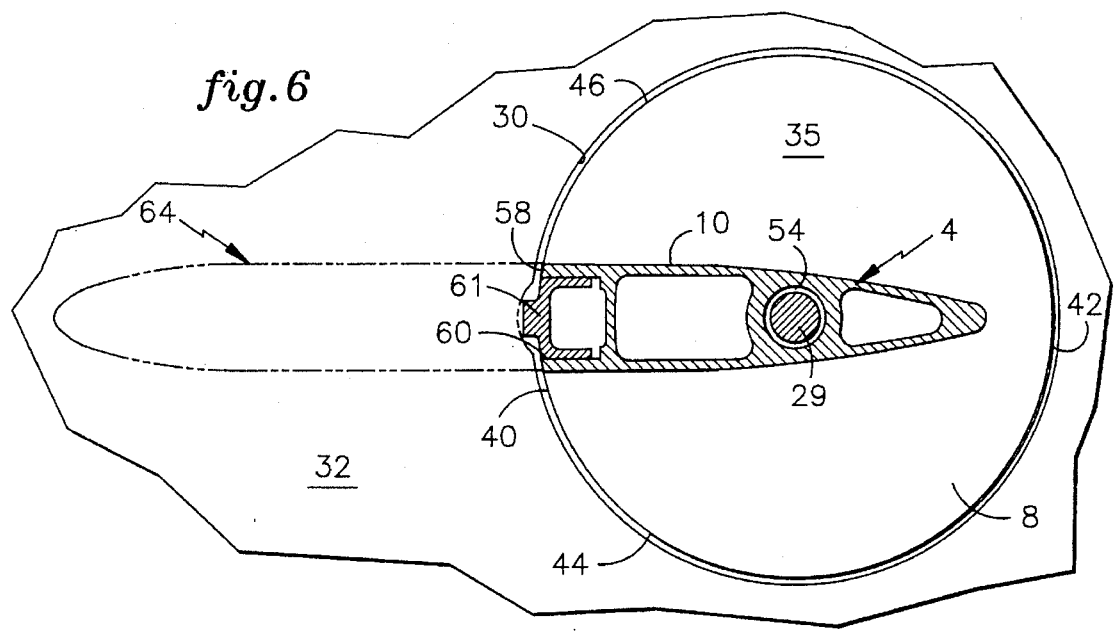
FIG. 6 is a cross sectional view of taken along line 6—6 of FIG. 2 of the piston central portion and strut member.

Additionally the upstream surface 58 of the piston having central portion 10 may be fitted with a slot 60 which slides over a key 61 which is attached to housing 14. The upstream surface 58 of the piston central portion 10 may be designed in the form of an aerodynamic shape in combination with the strut 64 as shown in FIG. 6, thereby reducing the disturbance in the bypass flow path 34. The key 61 and the slot 60 provide an antirotation means to ensure alignment of the strut 64 and the piston central portion 10. This also acts as an antirotation feature to insure alignment of the apron 38 and piston central portion 10.

The bleed valve responds to a preset pressure differential between a first location in the primary fluid flow path 22 and a second location in the primary flow path 22 such that as the pressure in the second location, which is in pressure communication with the chamber 12 in the housing 14 in which the first end 6 of the piston 4 is fitted, is greater than the pressure at the first location, which is in pressure and flow communication with the primary fluid flow path 22, the valve 4 remains in the closed position and none of the fluid of the primary fluid flow path 22 is permitted to pass from the primary fluid flow path 22 to the bypass fluid flow path 34. However, in the event that the pressure at the first location is greater than the second location by a predetermined amount, then the pressure in the chamber 12 of the housing 14 is less than that at the opening 30 of the inner shroud 32 and the piston 4 is slidably moved up the rod 29 thereby moving the second end 8 of the piston 4 into a position where it no longer seals the opening 30 in the inner shroud 32 and thereby permitting a portion of the primary fluid flow 22 to pass through the opening 30 in the inner shroud 32 to the bypass fluid flow path 34.

Figure 4A:
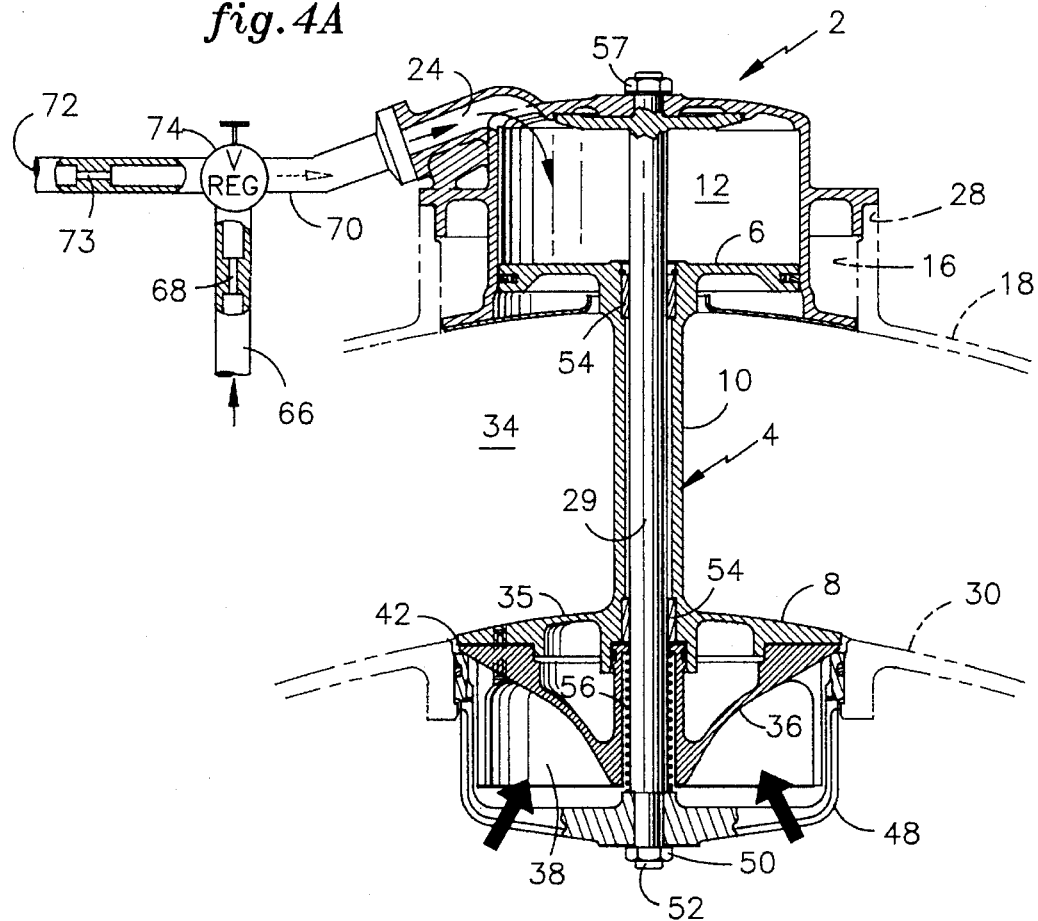
FIG. 4A is a cross sectional view of the valve showing the pressure control means.

As may be seen by viewing FIG. 4A the pressure from the first location is upstream from the maximum compressor outlet for the primary flow path 22, while the second location is downstream from the maximum compressor outlet and is in flow communication via a tube (partially indicated at 66). The tube is fitted with an orifice 68 (this may be an adjustable valve i.e. needle valve or a simple hole of a predetermined size) and connects with a second tube 70 forming a T or Y having one end connected to the housing at opening 24 and the other end 72 vented to atmosphere through an orifice 73. In addition, a regulating means 74 is fitted between the orifices 68 and 73 to control the valve opening to a certain compressor speed. The pressure created at opening 24 will be such that the valve will have a predetermined position as a function of compressor rotational speed, thereby bleeding as required and hence preventing surge.

The present invention offers a bleed valve for use in bypass engines having unique and beneficial advantages not seen in the prior art. The present invention discloses a bleed valve which is releasably mounted on the exterior of the engine to permit easy removal and maintenance without the disassembly of the engine as necessitated by prior designs. In addition the valve offers a minimum disturbance to the flow path of the bypass flow and therefore lessens any loss of efficiency due to the placement of such a device across the flow path of the bypass fluid.

While the particular invention has been described with reference to illustrated embodiments, this description is not meant to be construed as limiting. It is understood that although the present invention has been described in a preferred embodiment, various modifications of the illustrated embodiments as well as additional embodiments of the invention, will be apparent to persons of ordinary skill in this art without departing from the spirit of this invention. It is therefore contemplated that the appended claims.

We claim:

1. A bleed valve for use in a gas turbine engine, said engine having a bypass fluid flow path and a primary fluid flow path downstream from an engine inlet of said engine, said paths separated by barrier and said bypass fluid flow path having an outer perimeter, said bleed valve comprising;

a housing positioned on said outer perimeter of said bypass fluid flow path, and a piston having a first end which is fitted into said housing, said piston extending across said bypass fluid flow path; and said piston having a second end opposite said first end, said second end sealably fitted into an opening in said barrier separating said primary fluid flow path from said bypass fluid flow path; and wherein said piston is slidably movable to open and close said opening in response to a pressure differential between fluid pressures at two locations in said primary fluid flow path.

2. The bleed valve of claim 1 wherein the center of the piston is aerodynamically formed having a leading edge and a trailing edge and said leading edge is facing upstream of said bypass flow path.

3. A bleed valve for use in a bypass gas turbine engine, said engine having an engine inlet, a first fluid flow path downstream from said engine inlet formed by a compressor shroud positioned about one or more compressor stages through which air from said engine inlet is compressed and directed to a burner section of said engine where said compressed air is mixed with fuel and ignited, and a second bypass fluid flow path downstream from said engine inlet formed by an outer shroud of the engine and said compressor shroud through which bypass air from said engine inlet is directed past said compressor shroud, said bleed valve comprising;

a. a housing positioned within an opening within the outer shroud, said housing forming a chamber, wherein said chamber is in flow communication with said first fluid flow path at a first location; and b. a piston positioned to move within the chamber along a guide path, said guide path extending from the outer shroud through the housing across the bypass flow path to an opening in the compressor shroud which permits flow communication between the first fluid flow path and the bypass flow path at a second location wherein said first location is downstream from said second location in said first fluid flow path;

c. said piston having a first end moving within the housing chamber and a second end positioned opposite the first end, said second end formed to create a seal against the opening in the compressor shroud; and d. wherein the piston moves along said guide path between an open position and a closed position thereby unsealing or sealing the opening in the compressor shroud in response to the pressure differential between the first and the second locations in the first fluid flow path.

4. The bleed valve of claim 3 wherein said piston, between said first and second ends is aerodynamically formed having a leading edge and a trailing edge and said leading edge is facing upstream of the bypass flow path.

5. The bleed valve of claim 4 wherein said leading edge is fitted into a slot in a strut member, said strut member having an upstream and a downstream side, said slot in said downstream side of said strut member.

6. The bleed valve of claim 3 wherein said second end of said piston has a sealing surface and an upstream edge and wherein an arcuate apron extends toward and through the opening in said compressor shroud on said upstream edge of said second end.

7. The bleed valve of claim 6 wherein the apron extends toward and through said opening in said compressor shroud to a length sufficient such that said apron extends to or through said opening in said compressor shroud when said piston of said valve is in said open position.

8. A bleed valve for use in a bypass gas turbine engine, said engine having an engine inlet, a first fluid flow path downstream from said engine inlet formed by a compressor shroud positioned about one or more compressor stages through which air from said engine inlet is compressed and directed to a burner section of said engine where said compressed air is mixed with fuel and ignited, and a second bypass fluid flow path downstream from said engine inlet formed by an outer shroud of the engine and said compressor shroud through which bypass air from said engine inlet is directed past said compressor shroud, said bleed valve comprising;

a. a housing positioned within an opening within the outer shroud, said housing forming a chamber, wherein said chamber is in flow communication with said first fluid flow path at a first location; and b. a piston positioned to move within the chamber along a guide path, said guide path extending from the outer shroud through the housing across the bypass flow path to an opening in the compressor shroud which permits flow communication between the first fluid flow path and the bypass flow path at a second location wherein said first location is downstream from said second location in said first fluid flow path;

c. said piston having a first end moving within the housing chamber and a second end positioned opposite the first end, said second end formed to create a seal against the opening in the compressor shroud;

d. said piston, between said first and second ends, being aerodynamically formed having a leading edge and a trailing edge, said leading edge is facing upstream of said bypass flow path and being fitted into a slot in a strut member, said strut member having an upstream and a downstream side, said slot being in said downstream side of said strut member; and e. wherein the piston moves along said guide path between an open position and a closed position thereby unsealing or sealing the opening in the compressor shroud in response to the pressure differential between the first and the second locations in the first fluid flow path.

9. The bleed valve of claim 8 wherein said second end of said piston has a sealing surface and an upstream edge and wherein an arcuate apron extends toward and through the opening in said compressor shroud on said upstream edge of said second end.

10. The bleed valve of claim 9 wherein said apron extends toward and through said opening in said compressor shroud to a length sufficient such that said apron extends to or through said opening in said compressor shroud when said piston of said valve is in said open position.

* * * * *